United States Patent
Yamazaki et al.

(10) Patent No.: US 9,308,818 B2
(45) Date of Patent: Apr. 12, 2016

(54) POWER TRANSMISSION DEVICE

(71) Applicants: HONDA MOTOR CO., LTD., Minato-Ku, Tokyo (JP); Kabushiki Kaisha F.C.C., Hamamatsu-Shi, Shizuoka (JP)

(72) Inventors: Masaki Yamazaki, Wako (JP); Shinya Nishiyama, Wako (JP); Shinichiro Keyaki, Wako (JP); Yusuke Funayose, Wako (JP); Scott Batdorf, Raymond, OH (US); Masataka Murai, Hamamatsu (JP); Takayuki Suzuki, Hamamatsu (JP); Kaoru Aono, Hamamatsu (JP)

(73) Assignees: Honda Motor Co., Ltd., Tokyo (JP); Kabushiki Kaisha F.C.C., Shizuoka (JP)

( * ) Notice: Subject to any disclaimer, the term of this patent is extended or adjusted under 35 U.S.C. 154(b) by 0 days.

(21) Appl. No.: 14/285,077

(22) Filed: May 22, 2014

(65) Prior Publication Data
US 2015/0057090 A1 Feb. 26, 2015

Related U.S. Application Data

(60) Provisional application No. 61/868,729, filed on Aug. 22, 2013.

(51) Int. Cl.
| | |
|---|---|
| *B60K 17/354* | (2006.01) |
| *B60K 17/16* | (2006.01) |
| *B60K 17/34* | (2006.01) |
| *F16D 48/06* | (2006.01) |
| *B60K 17/344* | (2006.01) |
| *B60K 17/35* | (2006.01) |
| *F16D 11/00* | (2006.01) |
| *F16D 23/12* | (2006.01) |
| *B60K 23/08* | (2006.01) |
| *B60K 5/00* | (2006.01) |
| *B60K 23/04* | (2006.01) |

(52) U.S. Cl.
CPC ............. *B60K 17/16* (2013.01); *B60K 17/165* (2013.01); *B60K 17/34* (2013.01); *B60K 17/344* (2013.01); *B60K 17/35* (2013.01); *B60K 23/08* (2013.01); *F16D 48/064* (2013.01); *B60K 2005/003* (2013.01); *B60K 2023/046* (2013.01); *B60K 2023/0825* (2013.01); *F16D 2011/002* (2013.01); *F16D 2023/123* (2013.01)

(58) Field of Classification Search
CPC ...... B60K 17/16; B60K 17/34; F16D 48/064; F16D 2011/002; F16D 2023/123
USPC .......... 464/66.1, 67.1; 180/247–250; 475/231
See application file for complete search history.

(56) References Cited

U.S. PATENT DOCUMENTS 5,401,213 A * 3/1995 Muchmore et al.
7,951,038 B2 5/2011 Ina et al.

FOREIGN PATENT DOCUMENTS

JP 2008-279880 A 11/2008

* cited by examiner

*Primary Examiner* — Gregory Binda
(74) *Attorney, Agent, or Firm* — Carrier Blackman & Associates, P.C.; Joseph P. Carrier; Jeffrey T. Gedeon

(57) ABSTRACT

A power transmission device includes an input rotary member having a pressing portion, and an output rotary member having a receiving portion to be pressed by the pressing portion. The input rotary member forces the output rotary member to rotate when resilient members disposed between the input rotary member and the output rotary member are deformed by predetermined amounts.

3 Claims, 13 Drawing Sheets

POWER TRANSMISSION DEVICE

FIELD OF THE INVENTION

The present invention relates to a power transmission device including a motor, an input rotary member, a resilient member and an output rotary member and configured to transmit a power of the motor via the input rotary member and then the resilient member to the output rotary member.

BACKGROUND OF THE INVENTION

A vehicle designed to provide switching operations for switching between a four-wheel drive mode and a two-wheel drive mode and switching a differential mechanism from a locked position to an unlocked position or vice versa is put in practical use. A power transmission device configured to perform these switching operations collectively is known as disclosed in JP-A-2008-279880.

As for a power transmission device disclosed in JP-A-2008-279880, a rotary member is rotated by a motor. The rotary member rotates a connection member via a spring. The connection member rotates an actuating shaft. The actuating shaft has a first cam groove formed thereon to move a first folk in an axial direction of the actuating shaft. The movement of the first folk moves a first sleeve to switch a positive clutch from a connected position to a disconnected position for switching a four-wheel drive mode to a two-wheel drive mode. The actuating shaft has a second cam groove formed at a distal end thereof to move a second folk in a direction perpendicular to the axis of the shaft. The movement of the second folk moves a second sleeve to insert a pin into a cam surface of a differential mechanism to thereby lock the differential mechanism. The rotational elements and the sliding elements of the power transmission device are placed in actuating oil for lubricating these elements to reduce resistance to rotational movement of the rotational elements or sliding movement of the sliding elements.

In the power transmission device of JP-A-2008-279880, the spring is interposed between the rotary member and the connection member. The spring is deformed for a period of time until the positive clutch is brought to the connected position or the pin is inserted into the cam surface. By having this period of time until the positive clutch is brought to the connected position or the pin is inserted into the cam surface, that is, it is possible to prevent the motor from having an excessive load. The mechanism for creating such a time period is called "lost motion mechanism".

The actuating oil varies in viscosity depending upon temperature. The actuating oil hardens as the motor starts in a cold weather area. In this instance, the connection member tends not to rotate even when the rotary member rotates. For this reason, the motor runs for a long period of time, thereby compressing the spring greatly. As a result, a load on the motor increases.

From a standpoint of protection of the motor, it is desirable to shorten a running time of the motor and reduce a load on the motor even in a cold weather area.

SUMMARY OF THE INVENTION

An object of the present invention is to provide a power transmission device configured to shorten a running time of a motor and reduce a load on the motor.

According to one aspect of the invention, there is provided a power transmission device comprising: a motor; an input rotary member to be rotated by the motor, the input rotary member having an axis of rotation; a resilient member; an output rotary member disposed coaxially with the input rotary member such that a rotational force of the input rotary member is transmitted through the resilient member to the output rotary member, wherein a power of the motor is transmitted via the input rotary member and then the resilient member to the output rotary member, wherein the output rotary member includes a receiving portion, and wherein the input rotary member includes a pressing portion to abut on the receiving portion for rotating the output rotary member when the resilient member is deformed by a predetermined amount.

Where a load is excessive due to a hardened actuating oil etc., the pressing portion of the input rotary member abuts on the receiving portion of the output rotary member to thereby start rotating the output rotary member. Since the output rotary member starts to rotate when the resilient member is compressed by a predetermined amount, it is not likely that a load on the motor exceeds a predetermined value. Since the output rotary member starts to rotate when the resilient member is compressed by the predetermined amount, further, a running time of the motor is short. The present invention makes it possible to shorten a running time of the motor and reduce a load on the motor.

Preferably, the power transmission device further comprises a motor control section for controlling the motor to stop the output rotary member in one of a first position, a second position different from the first position, and a neutral position located intermediately between the first position and the second position, wherein the receiving portion is provided in plural, the receiving portions include a first receiving portion to abut on the pressing portion when the output rotary member moves from the neutral position to the first position, and a second receiving portion to abut on the pressing portion when the output rotary member moves from the neutral position to the second position.

One of forward and reverse rotations of the motor causes the output rotary member to move from the neutral position to the first position. The other rotation of the motor causes the output rotary member to move from the neutral position to the second position. This means that the output rotary member moves through only a half angle, thereby shortening a running time of the motor and reducing a load on the motor to a great extent.

Preferably, the input rotary member has an accommodating groove accommodating the resilient member therein, the accommodating grove being closed by the output rotary member, wherein the pressing portion is formed integrally with the input rotary member and protrudes along the axis of rotation of the input rotary member, and wherein the receiving portion is formed integrally with the output rotary member and extends perpendicularly to the axis of rotation of the input rotary member.

The receiving portion formed integrally with the output rotary member extends perpendicularly to the axis of rotation of the input rotary member without protruding in a direction along the axis of rotation.

Preferably, the power transmission device further comprises a switch pattern for providing the motor control section with positional information, the switch pattern being set not to change when the output rotary member is between the neutral position and the first position or between the neutral position and the second position.

Where the pressing portion presses the receiving portion to rotate the output rotary member in synchronization with the input rotary member, there is no need to detect the positions of the input and output rotary members during the synchronization of rotations of the input and output rotary members.

Thus, the switch pattern can be set to take a simple form without changing during the synchronization of rotation.

Preferably, the resilient member is a coil spring and wherein the accommodating groove includes a small groove for guiding a portion of the output rotary member in such a manner as to prevent flexing of the output rotary member.

By virtue of the small groove for guiding the output rotary member, the output rotary member can be smoothly moved by compression and decompression of the coil spring.

BRIEF DESCRIPTION OF THE DRAWINGS

A certain preferred embodiment of the present invention will hereinafter be described in detail, by way of example only, with reference to the accompanying drawings, in which.

DETAILED DESCRIPTION OF THE PREFERRED EMBODIMENTS

Figure 1:
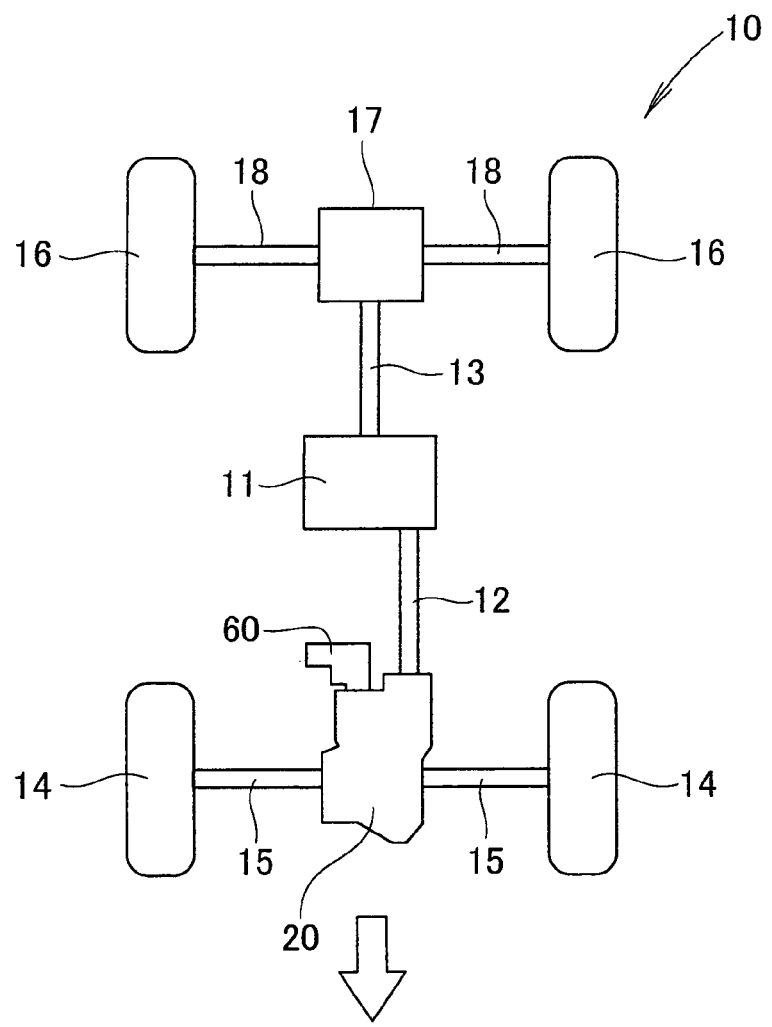
FIG. 1 is a diagrammatical view of a vehicle employing a power transmission device according to the present invention.

As shown in FIG. 1, a vehicle 10 includes an engine 11 and front and rear propeller shafts 12, 13 extending from the engine 11. A power transmission device 20 according to the present invention is disposed between a pair of front wheels 14, 14. The front propeller shaft 12 has a distal end connected to the power transmission device 20. Drive shafts 15, 16 extend from the power transmission device 20 and are connected to the respective front wheels 14, 14. A rear differential 17 is disposed between a pair of rear wheels 16, 16. The rear propeller shaft 13 has a distal end connected to the rear differential 17. Drive shafts 18, 18 extend from the rear differential 17 and are connected to the respective rear wheels 16, 16. The power transmission device 20 includes an actuator 60 operable to select one of a four-wheel drive mode, a two-wheel drive mode and a locked position of a differential mechanism 30 (FIG. 2).

Figure 2:
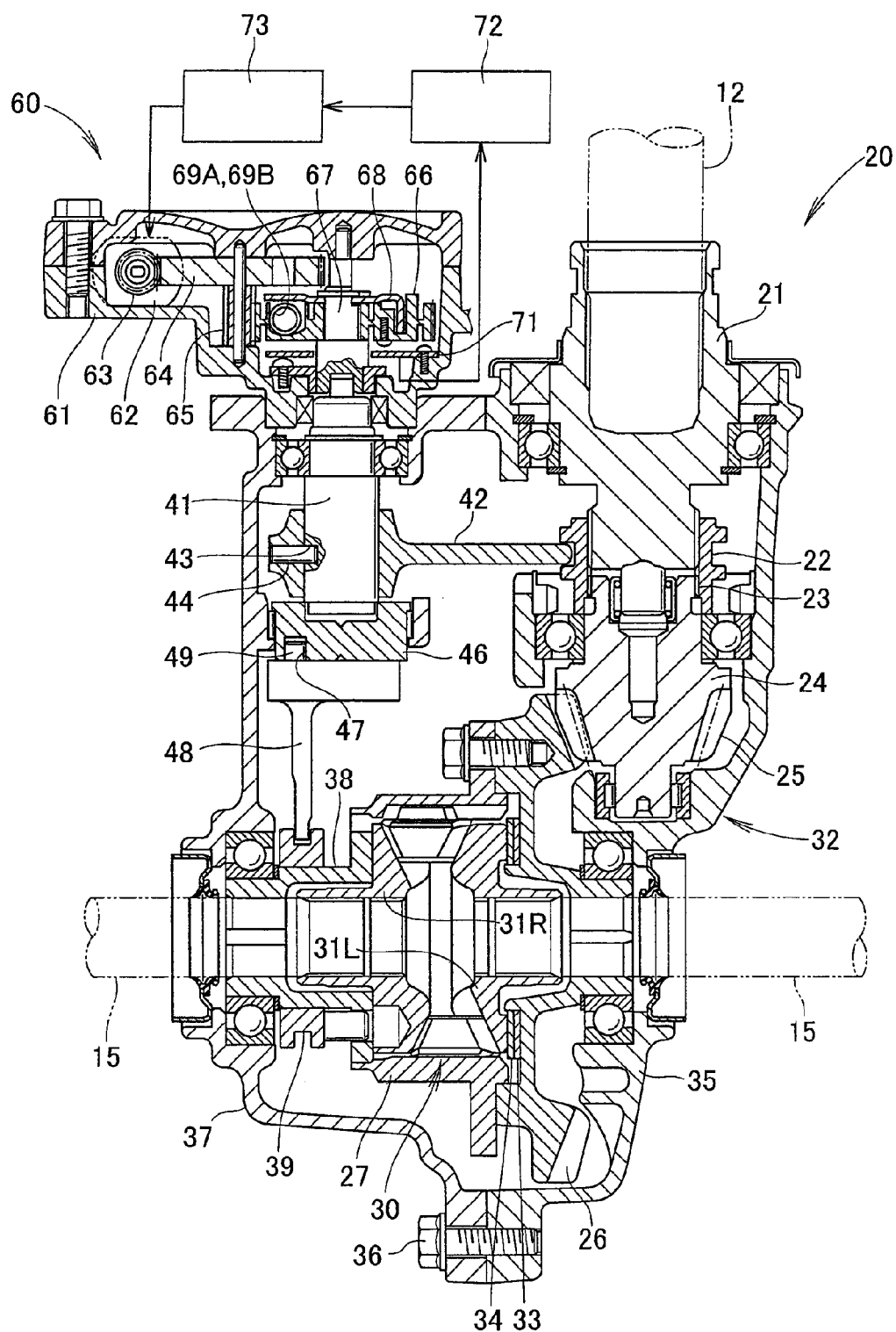
FIG. 2 is a cross-sectional view of the power transmission device.

As shown in FIG. 2, the power transmission device 20 includes a driving member 21 connected to the distal end of the front propeller shaft 12, a first sleeve 22 axially movably mounted on the driving member 21, and a driven member 24 disposed coaxially with the driving member 21 and having a first spline 23 configured to mesh with the first sleeve 22. The power transmission device 20 also includes a pinion gear 25 carried on the driven member 24, a ring gear 26 meshing with the pinion gear 25, and a differential case 27 rotatable with the ring gear 26 and defining a differential chamber. The power transmission device 20 further includes the differential mechanism 30 accommodated in the differential case 27 for providing a difference in rotational speed between the left and right front wheels. The power transmission device 20 further includes left and right output cams 31L, 31R forming one part of the differential mechanism 30 for transmitting to the drive shafts 15, 15 a power transmitted to the ring gear 26. The power transmission device 20 further includes a gear case 32 accommodating the ring gear 26 and the differential case 27. A shim 33 and a disc spring 34 are interposed between the ring gear 26 and the left output cam 31L for urging the left output cam 31L toward the right output cam 31R.

The gear case 32 is formed by a first case half 35 rotatably supporting the pinion gear 25, and a second case half 37 connected to the first case half 35 through a bolt 36.

The differential case 27 includes a tubular shaft 38 disposed opposite the ring gear 26, and a second sleeve 39 axially movably fitting around the tubular shaft 38.

Attached to the second case half 37 is an actuating shaft 41 extending in parallel to the driving member 21. A first folk 42 is attached to the actuating shaft 41. The actuating shaft 41 is adapted to be rotated by the actuator 60. The actuating shaft 41 has a first cam groove 43 formed on a lateral side surface thereof. A first pin 44 extending from the first folk 42 fits into the first cam groove 43. The first folk 42 has a distal end fitting into the first sleeve 22. A disc 46 is rotatably attached to the second case half 37 and has one surface fittingly receiving one end portion of the actuating shaft 41. An opposite surface of the disc 46 has a second cam groove 47 into which a second pin 49 extending from a second folk 48 fits. The second folk 48 has a distal end fitting into the second sleeve 39.

The actuator 60 includes a case 61 attached to the second case half 37, a motor 62 accommodated within the case 61, a worm 63 attached to a motor shaft of the motor 62, a wheel 64 rotatably supported by the case 61 and adapted to be rotated by the worm 63, and a gear 65 of a reduced diameter formed integrally with the wheel 64. The actuator 60 also includes an input rotary member 66 to be rotated by the reduced-diameter gear 65, and a rotational shaft member 67 rotatably supported by the case 61 and rotatably supporting the input rotary member 66. The actuator 60 further includes an output rotary member 68 fitting around the rotational shaft member 67. Furthermore, the actuator 60 includes resilient members 69A, 69B disposed between the input rotary member 66 and the output rotary member 68. In addition, the actuator 60 includes a board 71 disposed within the case 61 for detecting rotational positions of the output rotary member 68. Connected to the actuator 60 are a switch pattern identification section 72 and a motor control section 73 for controlling the motor 62.

A conductive pattern is printed on the board 71 for providing switch patterns to be identified by the switch pattern identification section 72. On the basis of the identification, the motor control section 73 controls the motor 62 to allow forward rotation of the motor 62, reverse rotation of the motor 62, and stop of rotation of the motor 62.

Figure 3:
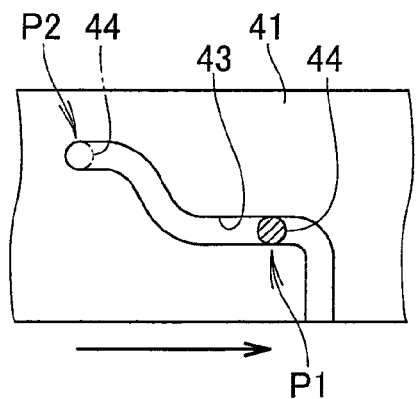
FIG. 3 is a view showing a first cam groove.
Figure 4:
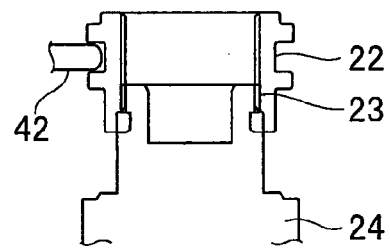
FIG. 4 is a view showing a position of a first sleeve in a four-wheel drive mode.

As shown in FIG. 3 showing the lateral side surface of the actuating shaft 41, the first pin 44 is shown as being located in a first position P1 of the first cam groove 43 formed on the lateral side surface of the actuating shaft 41. At this time, the first sleeve 22 fittingly engages the first spline 23, as shown in FIG. 4, to connect the driving member 21 to the driven member 24 to provide the four-wheel drive mode.

Figure 5:
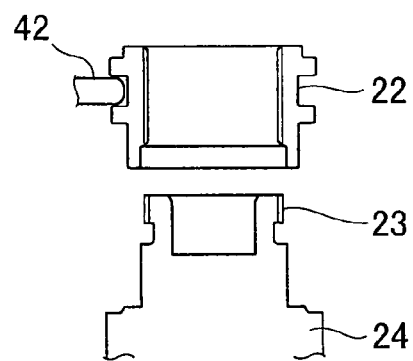
FIG. 5 is a view showing a position of the first sleeve in a two-wheel-drive mode.

Referring to FIG. 3, the first pin 44 shifts relative to the actuating shaft 41 to reach a second position P2, as the actuating shaft 41 rotates. With the first pin 44 being located in the second position P2, the first sleeve 22 is released from the first spline 23, as shown in FIG. 5, to provide the two-wheel drive mode.

Figure 6:
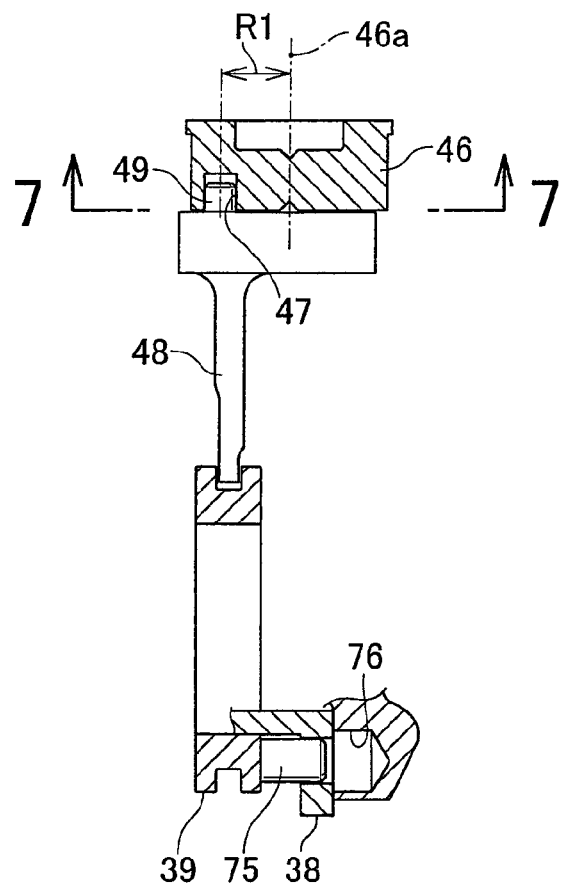
FIG. 6 is a view showing a differential mechanism in an unlocked position.

As shown in FIG. 6, the second pin 49 is located a radius R1 from an axis of rotation 46a of the disc 46. A lock pin 75 extends from the second sleeve 39. When the second pin 49 is located the radius R1 from the axis of rotation 46a, the lock pin 75 is released from a recess 76 formed on the output cam 31R. As a result, the differential mechanism 30 is put in an unlocked position to allow the front wheels to rotate at different speeds.

Figure 7:
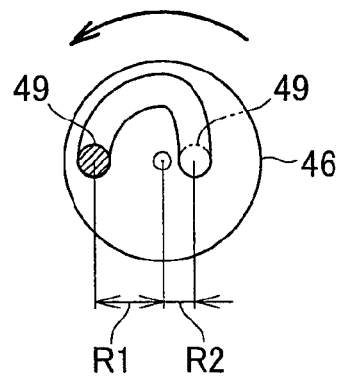
FIG. 7 is a view taken in a direction of arrows 7, 7 of FIG. 6.
Figure 8:
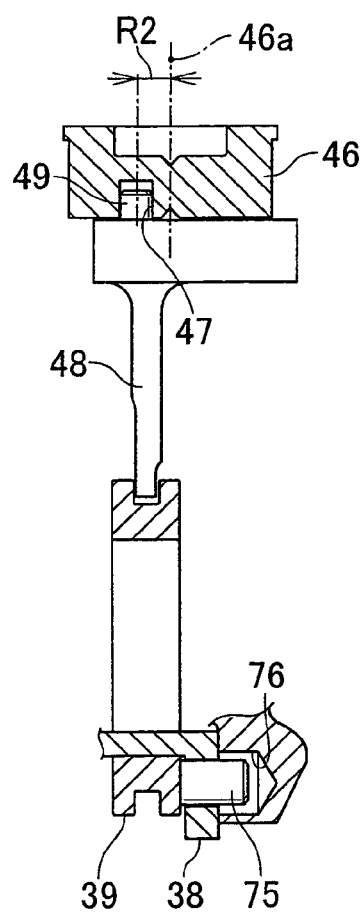
FIG. 8 is a view showing the differential mechanism in a locked position.

As shown in FIG. 7, the second cam groove 47 has a groove portion located the radius R1 from the axis of rotation 46a, and a groove portion located a radius R2 from the axis of rotation 46a. The radius R2 is smaller than the radius R1. When the disc 46 rotates, the second pin 49 shifts relative to the disc 46 to reach the groove portion located the radius R2 from the axis of rotation 46a. Then, the second sleeve 39 advances to cause the lock pin 75 to fit into the recess 76, as shown in FIG. 8. By the lock pin 75 fitting into the recess 76, the tubular shaft 38 is mechanically coupled to the output cam 31R to stop the output cam 31R from rotating freely. This puts the differential mechanism 30 into the locked position to allow the front wheels to rotate the same speed.

Figure 9:
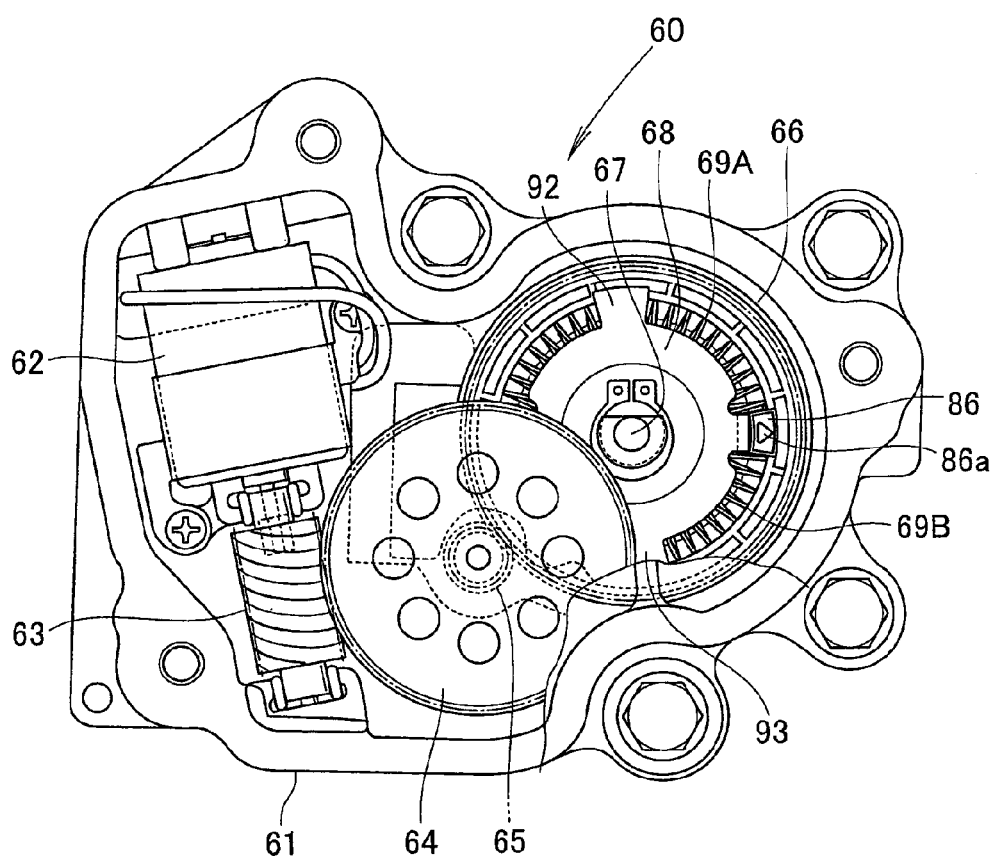
FIG. 9 is a view showing an inside of an actuator.

As shown in FIG. 9, the case 61 accommodates the motor 62, the worm 63, the wheel 64, the reduced-diameter gear 65, the input rotary member 66, the output rotary member 68 and the resilient members 69A, 69B.

Figure 10:
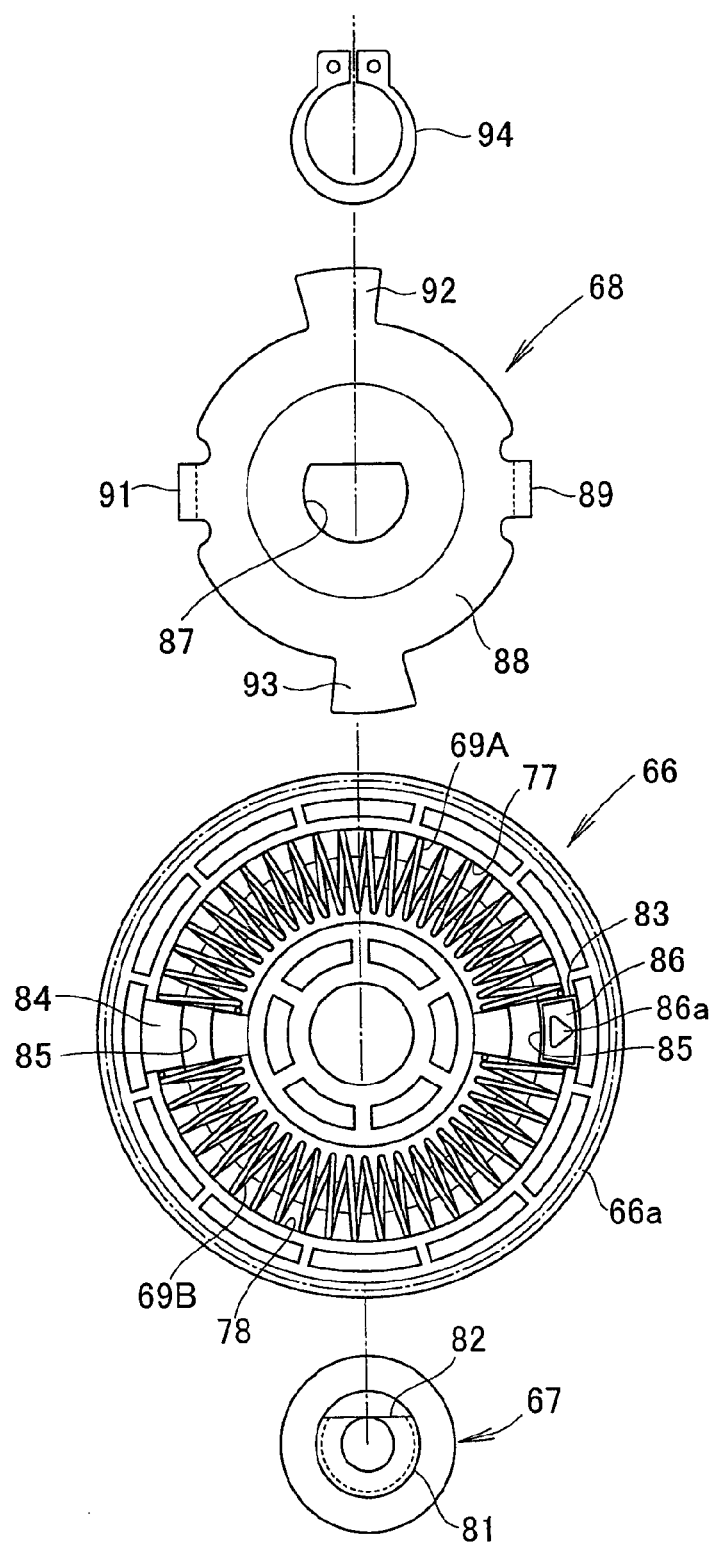
FIG. 10 is an exploded view of a main part of the actuator.

As shown in FIG. 10, the input rotary member 66 is of complicated shape and hence is preferably a resinous gear. The input rotary member 66 has a groove taking the form of an arc having a central angle less than 180 degrees. The groove defines a first accommodating groove 77 accommodating the first resilient member 69A. The input rotary member 66 also includes a second accommodating groove 78 accommodating the second resilient member 69B. The input rotary member 66 further includes first and second spring seats 83, 84 disposed between the first and second accommodating grooves 77, 78.

Figure 11:
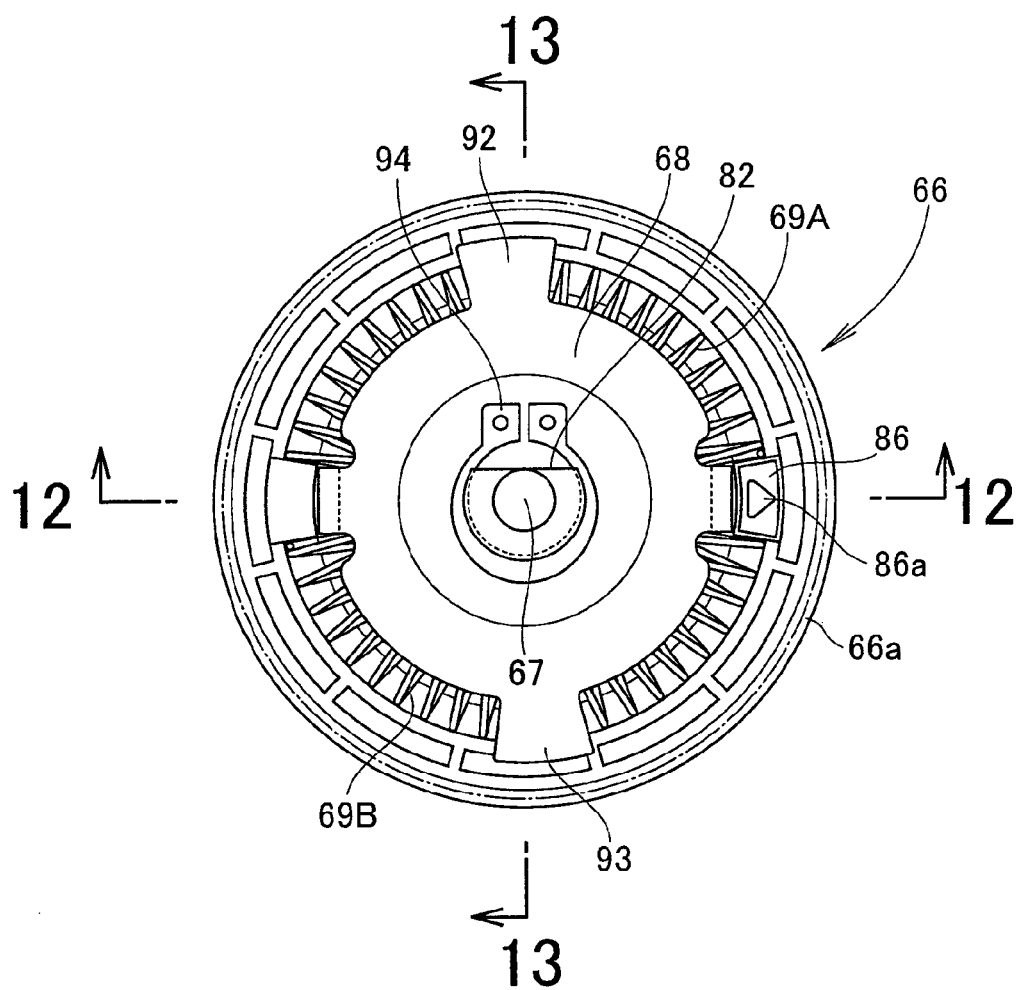
FIG. 11 is a plan view of the main part of the actuator.

The output rotary member 68 includes a disc portion 88 having a hole 87 of major-segment shape formed centrally thereof. The output rotary member 68 also includes first and second, resilient receiving portions 89, 91 formed by edges of the disc portion 88 which are bent in a direction toward the back side of the sheet of FIG. 10. The output rotary member 68 further includes first and second receiving portions 92, 93 formed by projecting edges of the disc portion 88. The output rotary member 68 can be easily manufactured by punching and bending a metal blank such as carbon steel. The input rotary member 66 fits around a cylindrical portion 81 of the rotational shaft member 67, and then the output rotary member 68 fits around a major-segment-shaped portion 82 of the rotational shaft member 67, inserting the resilient receiving portions 89, 91 into passages 85, 85. Finally, a C-shaped, snap ring 94 fits around the rotational shaft member 67. As a result, an assembly shown in FIG. 11 is provided.

Figure 12:
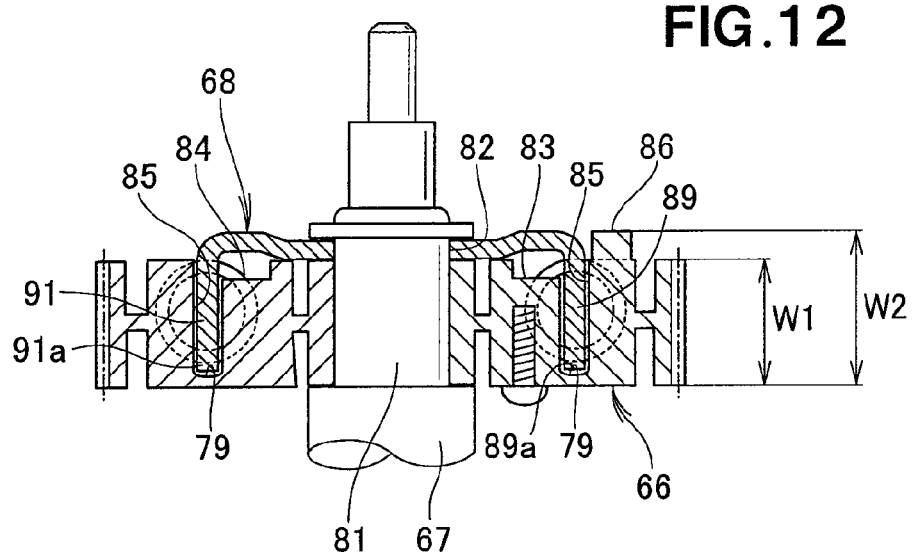
FIG. 12 is a cross-sectional view taken along line 12-12 of FIG. 11.

As shown in FIG. 12, the first and second spring seats 83, 84 include the respective passages 85, 85 which are equal in width to small grooves 79, 79. In addition, the first spring seat 83 includes a pressing portion 86 protruding along an axis of rotation of the input rotary member 66. As shown in FIG. 11, the pressing portion 86 has a triangular mark 86a on a top surface thereof for avoiding mistakes in making the assembly shown in FIG. 11.

Figure 13:
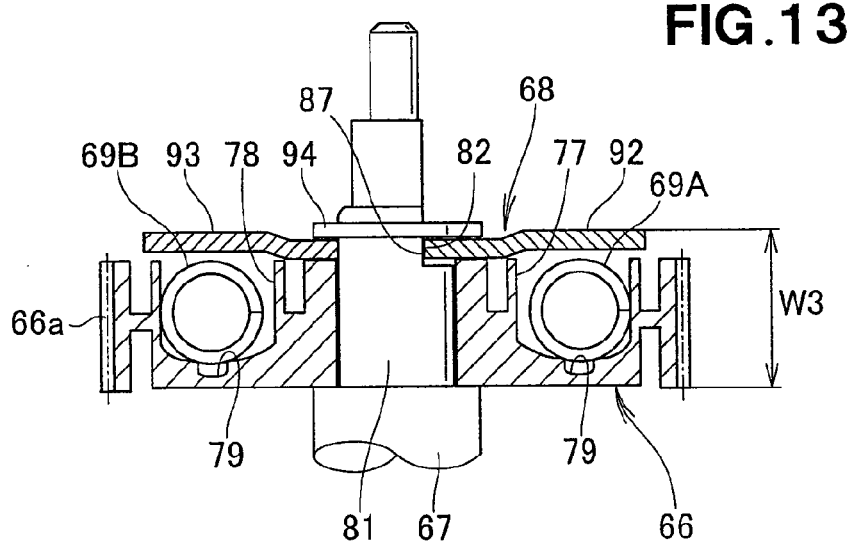
FIG. 13 is a cross-sectional view taken along line 13-13 of FIG. 11.

As shown in FIG. 13, the input rotary member 66 has a tooth 66a on formed an outer circumference thereof. The first and second accommodating grooves 77, 78 accommodating the resilient members 69A, 69B are offset from the tooth 66a toward the axis of rotation of the input rotary member 66. The first and second accommodating grooves 77, 78 have the small grooves 79, 79 at bottoms thereof. The small grooves 79, 79 have widths slightly larger than thicknesses of distal end portions 89a, 91a of the first and second resilient receiving portions 89, 91 such that the distal end portions 89a, 91a fit into the small grooves 79, 79.

The resilient member 69 is preferably a coil spring. When compressed, a compressed coil spring has a property of taking a meander shape. The first and second receiving portions 89, 91 shown in FIG. 12 resiliently deform when subjected to forces directed perpendicularly to the rotational shaft member 67. When the coil spring is compressed taking a meander shape, the first resilient receiving portion 89 or the second resilient receiving portion 91 is subjected to a force directed obliquely thereto, but does not flex. That is, since the distal end portion 89a of the first resilient receiving portion 89 and the distal end portion 91a of the second resilient receiving portion 91 are received in the small grooves 79, 79, it is not likely that the first and second resilient portions 89, 91 flex. As a result, it is unlikely that a force is partially applied to the rotational shaft member 67. In addition, it is unlikely that the resilient members 69 are caught by the bottoms of the resilient receiving portions 89, 91.

As shown in FIG. 13, the rotational shaft member 67 includes the cylindrical portion 81 and the major-segment-shaped portion 82 extending upwardly from the cylindrical portion 81. The input rotary member 66 is rotatably supported by the rotational shaft member 67, fitting around the cylindrical portion 81. The output rotary member 68 closing the accommodating grooves 77, 78 fits around the major-segment-shaped portion 82 so as to rotate together with the rotational shaft member 67. The term "major-segment shape" is a circle having a portion cut off.

Figure 14:
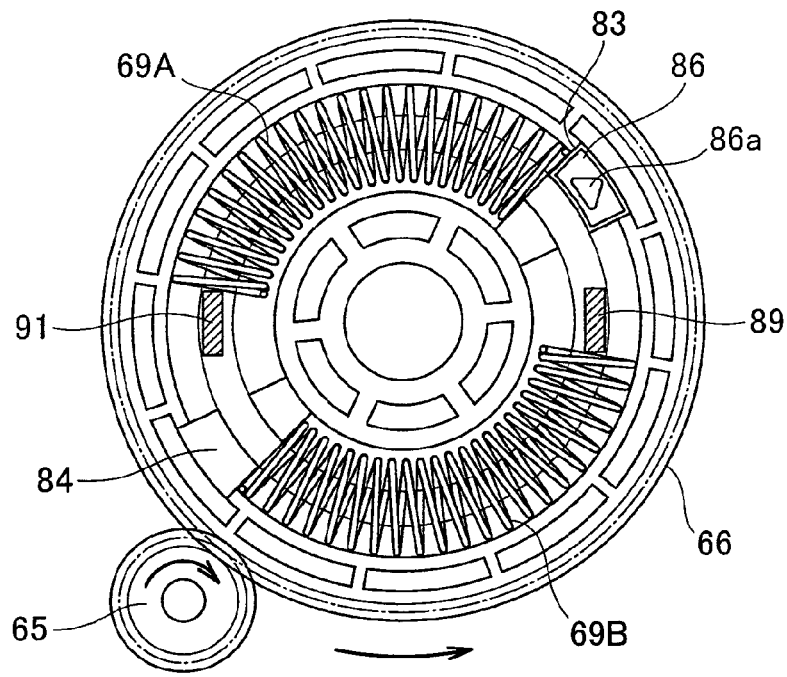
FIG. 14 is a view showing how resilient members function under a normal load.
Figure 15:
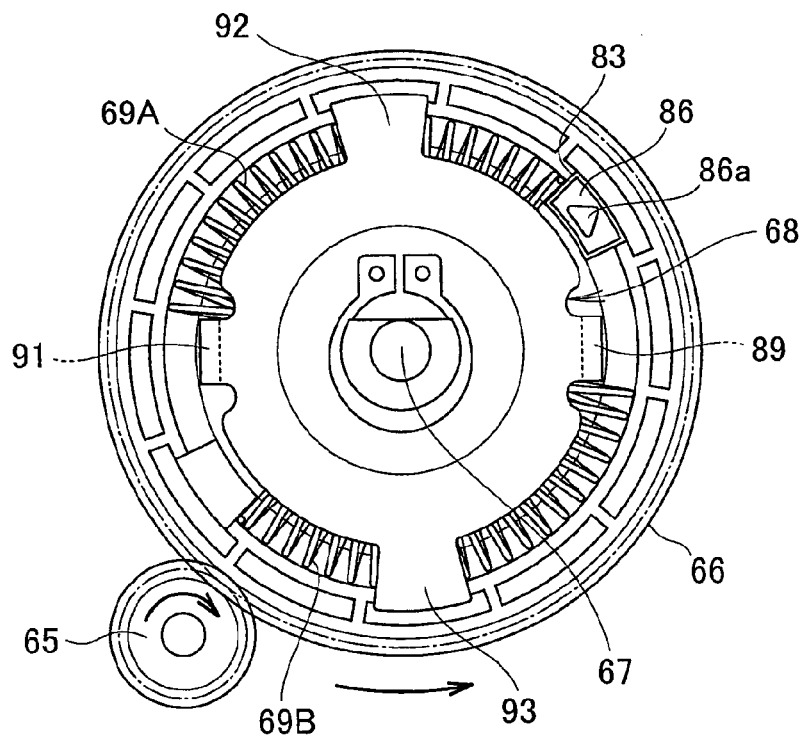
FIG. 15 is a view showing how an output rotary member functions under the normal load.

As shown in FIG. 14 and FIG. 15, the reduced-diameter gear 65 rotates clockwise, the input rotary member 66 is rotated counterclockwise. One end of the first resilient member 69A abuts on the first spring seat 83. The second spring seat 84 moves away from the second resilient receiving portion 91. Since the second resilient receiving portion 91 remains without moving, an opposite end of the first resilient member 69A abuts on the second resilient receiving portion 91. One end of the second resilient member 69B abuts on the second spring seat 84 while an opposite end of the second resilient member 69B abuts on the first resilient receiving portion 89. The first and second resilient members 69A, 69B produce reaction forces in proportion to lengths by which the members 69A, 69B are compressed. The reaction forces produced by the first and second resilient members 69A, 69B deformed by predetermined amounts are kept until the forces are used for the engagement between the first sleeve 22 and the first spline 23 or connection between the second sleeve 39 and the output cam 31R.

Figure 16:
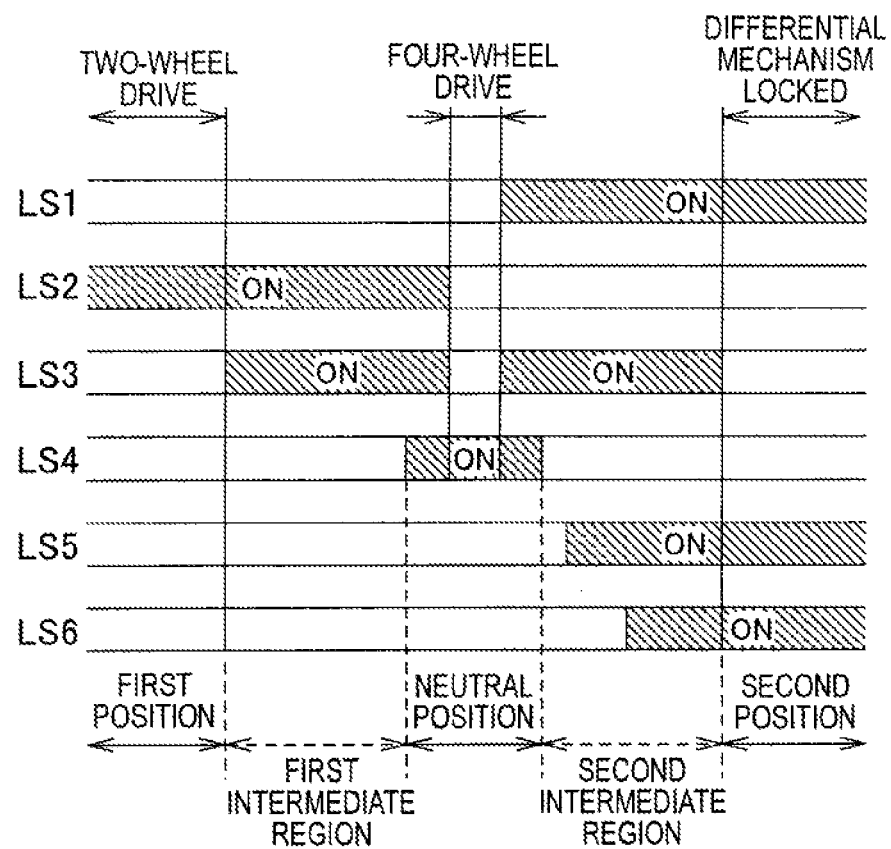
FIG. 16 is a view showing switch patterns.

As shown in FIG. 16, in the present invention, the switch patterns are provided by at least reference numerals LS1 to LS6. Switching mechanisms LS1 to LS3 can detect rotational positions of the input rotary member 66. Switching mechanisms LS4 to LS6 can detect rotational positions of the output rotary member 68. When instructed to switch the four-wheel drive mode to the two-wheel drive mode, the motor control section drives the motor 62 to rotate. By detecting that the switching mechanisms LS2, LS3 are switched to ON states, it is detected that the input rotary member 66 is rotated in a direction to switch the four-wheel drive mode to the two-wheel drive mode. Next, when the switching mechanism LS4 is switched to an OFF state, it is detected that the first sleeve 22 is disengaged from the first spline 23. The rotation continues to rotate the input rotary member 66 and the output rotary member 68 back to a first position providing the two-wheel drive mode in which the switching mechanism LS2 only is in the ON state. When the switching mechanism LS2 only is in the ON state, the motor 62 stops rotating, thereby maintaining the two-wheel drive mode. On the other hand, when instructed to switch the four-wheel drive mode to the locked position of the differential mechanism 30, the motor control section rotates the motor 62 in a reverse direction. By detecting that the switching mechanisms LS1, LS3 are switched to ON states, it is detected that the input rotary member 66 is rotated in a direction to switch the four-wheel drive mode to the locked position of the differential mechanism. As the output rotary member 68 is rotated, it is detected that the switching mechanism LS4 is switched to an OFF state, the switching mechanism LS5 is switched to an ON state and then the switching mechanism LS6 is switched to an ON state, thereby detecting that the differential mechanism is put into the locked position. The rotation continues until the switching mechanism LS3 is switched to an OFF state with the switching mechanism LS1 in the ON state. Namely, when the switching mechanism LS3 is switched to the OFF state with the switching mechanism LS1 in the ON state, the motor 62 stops rotating, thereby maintaining the locked position of the differential mechanism.

Referring back to FIG. 14 and FIG. 15, where a load greater than a standard value is applied to the rotational shaft member 67, the output rotary member 68 remains still but the input rotary member 66 rotates. If no measures were taken in this regard, the input rotary member 66 would rotate until the resilient member is fully compressed. This means that the motor 62 would run for a period of time longer than a standard period of time. That is, the motor 62 would have a load over a long period of time. This would result in excessive burden being borne by the motor 62. The present invention takes measures as follows, to address these problems.

Figure 17:
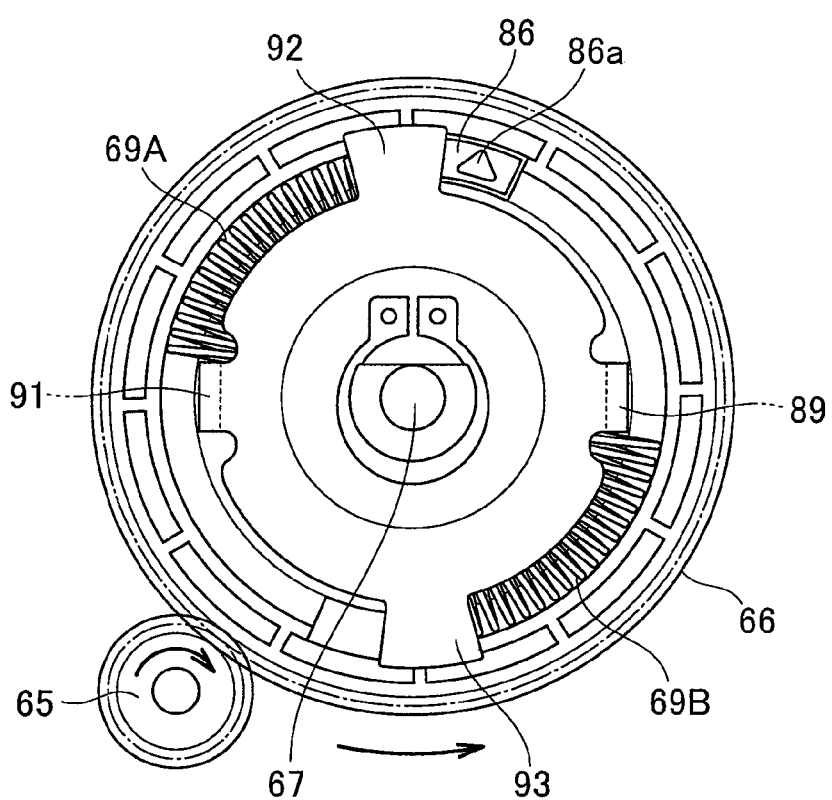
FIG. 17 is a view showing functions of a pressing portion of an input rotary member and a receiving portion of the output rotary member.

As shown in FIG. 17, when the input rotary member 66 keeps rotating counterclockwise and the output rotary member 68 remains still, the pressing portion 86 comes into abutment on the first receiving portion 92, after which the output rotary member 68 rotates together with the input rotary member 66. As a result, it is not likely that the motor 62 runs for an excessive time. The pressing portion 86 protrudes along an axial direction of the rotational shaft member 67, as shown in FIG. 12. The input rotary member 66 has a main thickness W1 and a thickness W2 at the pressing portion 86. The thickness W2 may be in the order of 1.25 times the thickness W1. The first and second receiving portions 92, 93 are simply shaped to extend radially. An assembly of the input rotary member and the output rotary member has a thickness W3 at the receiving portion 92 or 93. The thickness W3 is smaller than the thickness W2. The first and second receiving portions 92, 93 do not protrude beyond the input rotary member 66 in a direction perpendicular to the axial of the input rotary member 66. This is why it becomes possible to take the above measures without lengthening dimensions of the input rotary member 66 in both the axial direction and the direction perpendicular to the axial direction. As a result, the power transmission device can be kept compact.

Figure 18:
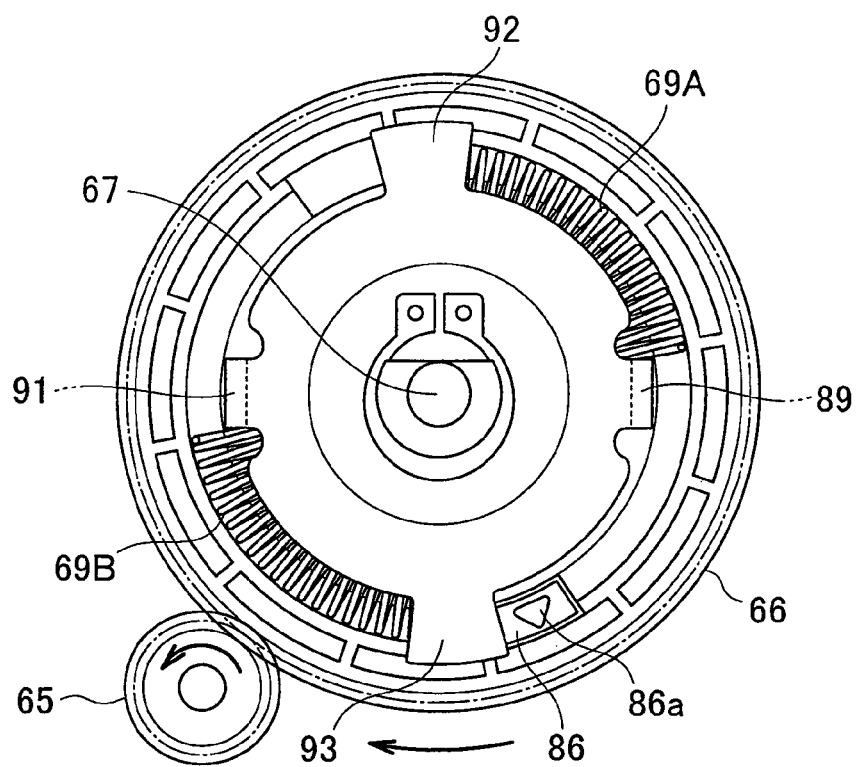
FIG. 18 is another view showing functions of the pressing portion of the input rotary member and a receiving portion of the output rotary member.

As shown in FIG. 18, when the input rotary member 66 keeps rotating clockwise and the output rotary member 68 remains still, the pressing portion 86 comes into abutment on the second receiving portion 93, after which the output rotary member 68 rotates together with the input rotary member 66. As a result, it is not likely that the motor 62 runs for an excessive time.

Turning back to FIG. 16, the switching mechanism LS4 in the ON state provides a neutral position, the two-wheel drive mode is provided by a first position, and the locked position of the differential mechanism is provided by a second position. In a first intermediate region between the neutral position and the first position, the switching mechanisms LS2, LS3 are both in the ON states, causing no changes in their respective switch patterns. Also, in a second intermediate region between the neutral position and the second position, the switching mechanisms LS1, LS3 are both in the ON states, causing no changes in their switch patterns. As shown in FIG. 17 and FIG. 18, since the pressing portion 86 rotates pressing the first receiving portion 92 (or the second receiving portion 93) to make the output rotary member 68 rotate together with the input rotary member, there is no need to determine individually positions of the input rotary member and the output rotary member during rotational movement of the input rotary member and the output rotary member in the first and second intermediate regions.

Obviously, various minor changes and modifications of the present invention are possible in light of the above teaching. It is therefore to be understood that within the scope of the appended claims the invention may be practiced otherwise than as specifically described.

What is claimed is:

1. A power transmission device comprising:
   a motor;
   an input rotary member to be rotated by the motor, the input rotary member having an axis of rotation;
   a resilient member;
   an output rotary member disposed coaxially with the input rotary member such that a rotational force of the input rotary member is transmitted through the resilient member to the output rotary member;
   a motor control section for controlling the motor to stop the output rotary member in one of a first position, a second position different from the first position, and a neutral position located intermediately between the first position and the second position; and
   a switch pattern for providing the motor control section with positional information about the input rotary member and the output rotary member to ensure stopping of the output rotary member in one of the first position, the second position and the neutral position by the motor under the control of the motor control section, the switch pattern being set not to change when the output rotary member is between the neutral position and the first position or between the neutral position and the second position,
   wherein a power of the motor is transmitted via the input rotary member and then the resilient member to the output rotary member,
   wherein the output rotary member includes a receiving portion, and wherein the input rotary member includes a pressing portion to abut on the receiving portion for rotating the output rotary member when the resilient member is deformed by a predetermined amount, wherein the receiving portion is provided in plural, the receiving portions include a first receiving portion to abut on the pressing portion when the output rotary member moves from the neutral position to the first position, and a second receiving portion to abut on the pressing portion when the output rotary member moves from the neutral position to the second position.

2. The device of claim 1, wherein the input rotary member has an accommodating groove accommodating the resilient member therein, wherein the pressing portion is formed integrally with the input rotary member and protrudes along the axis of rotation of the input rotary member, and wherein the receiving portion is formed integrally with the output rotary member and extends perpendicularly to the axis of rotation of the input rotary member, the accommodating groove being closed partially by the receiving portion of the output rotary member.

3. The device of claim 2, wherein the resilient member is a coil spring and wherein the accommodating groove includes a small groove for guiding a portion of the output rotary member in such a manner as to prevent flexing of the output rotary member.

\* \* \* \* \*